United States Patent

Kobayashi et al.

Patent Number: 6,023,364
Date of Patent: Feb. 8, 2000

[54] ELECTROCHROMIC MIRROR

[75] Inventors: Masaaki Kobayashi; Yoshinori Nishikitani, both of Yokohama, Japan

[73] Assignee: Nippon Oil Co., Ltd., Tokyo, Japan

[21] Appl. No.: 09/115,035

[22] Filed: Jul. 14, 1998

[30] Foreign Application Priority Data

Jul. 15, 1997 [JP] Japan ..................... 9-205428

[51] Int. Cl.$^7$ ..................... G02F 1/15
[52] U.S. Cl. ................. 359/265; 359/267; 359/270; 359/273
[58] Field of Search .................. 359/265, 267, 359/269, 270, 273; 252/582, 583; 546/257, 258

[56] References Cited

U.S. PATENT DOCUMENTS

| | | | |
|---|---|---|---|
| 4,473,695 | 9/1984 | Wrighton et al. | 546/266 |
| 4,841,058 | 6/1989 | Endo et al. | 546/257 |
| 5,729,379 | 3/1998 | Allemand et al. | 359/270 |
| 5,751,467 | 5/1998 | Byker | 359/265 |
| 5,818,636 | 10/1998 | Leventis et al. | 359/273 |

FOREIGN PATENT DOCUMENTS 63-18336  1/1988  Japan .

OTHER PUBLICATIONS

Kirk–Othmer, Encyclopedia of Chemical Technology, Fourth Edition (1993), vol. 6, pp. 312–314.

*Primary Examiner*—Georgia Epps
*Assistant Examiner*—Margaret Burke
*Attorney, Agent, or Firm*—Akin, Gump, Strauss, Hauer & Feld, L.L.P.

[57] ABSTRACT

An electrochromic mirror (10) comprises an reflective electrically conductive substrate and a transparent electrically conductive substrate, a layer of an ion conductive material (14) disposed therebetween and at least one electrochromic chromogenic layer (13) disposed either between the ion conductive material layer and the reflective electrically conductive substrate or between the ion conductive material layer and the transparent electrically conductive substrate, said electrochromic chromogenic layer containing a compound having a viologen structure represented by the formula

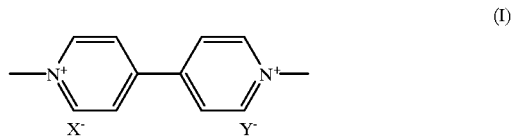

(I)

wherein $X^-$ and $Y^-$ may be the same or different and each indicate a counter anion selected from the group consisting of a halogen anion, $ClO_4^-$, $CH_3COO^-$, and $CH_3(C_6H_4)SO_3^-$.

The inventive mirror can be put in a various applications such as an antiglare mirror for an automobile and a decorative mirror for out door use.

11 Claims, 1 Drawing Sheet

ELECTROCHROMIC MIRROR

BACKGROUND OF THE INVENTION

1. Field of the Invention

This invention relates to electrochromic mirrors and more particularly such an electrochromic mirror which can used as an antiglare mirror for an automobile or a decorative mirror for indoor use.

2. Prior Art

In Japanese Patent Laid-Open Publication No. 63-18336, there is disclosed an electrochromic antiglare mirror comprising a chromogenic material in the form of a film obtained by sputtering or vacuum-depositing an inorganic oxide such as tungsten oxide ($WO_3$) over a transparent electrically conductive film.

However, the production of such an electrochromic mirror becomes costly because of the film forming operation requiring a process carried out under vacuum. A demand has therefore been placed on an electrochromic mirror which can be manufactured with an inexpensive material and by a simple and easy method.

SUMMARY OF THE INVENTION

It is an object of the present invention made to solve the aforementioned problems by using a specific electrically conductive high molecular compound as a chromogenic film.

According to the present invention, there is provided an electrochromic mirror comprising a reflective electrically conductive substrate, a transparent electrically conductive substrate, a layer of an ion-conductive material disposed therebetween and at least one electrochromic chromogenic layer disposed either between the ion-conductive material layer and the reflective electrically conductive substrate or between the ion-conductive material layer and the transparent electrically conductive substrate, the electrochromic chromogenic layer containing a compound having a viologen structure represented by the formula

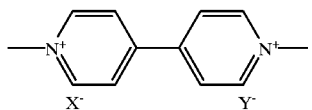

(I)

wherein $X^-$ and $Y^-$ may be the same or different and each are a counter anion selected from the group consisting of an halogen anion, $ClO_4^-$, $CH_3COO^-$ and $CH_3(C_6H_4)SO_3^-$.

One embodiment of an electrochromic mirror according to the present invention is characterized by all components thereof being solid.

DETAILED DESCRIPTION OF THE INVENTION

Figure 1:
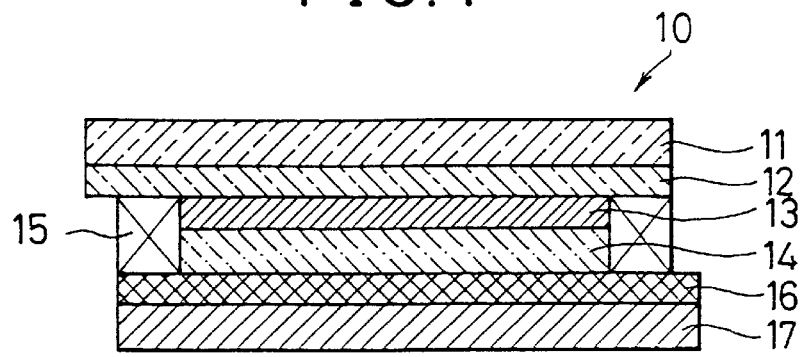
FIG. 1 is a cross-sectional view of an electrochromic mirror according to a first embodiment of the invention.

In the present invention, an electrically conductive substrate used as a reflective electrically conductive substrate and a transparent electrically conductive substrate may be any types of substrates as long as they perform the function of an electrode. More specifically, the electrically conductive substrate may be that of which substrate itself is electrically conductive or that of which substrate is not electrically conductive but has the layer of an electrode disposed thereon. The electrochromic mirror according to the present invention includes a pair of such electrically conductive substrates one of which is the transparent and the other of which is reflective of light. Both these substrates may have a flat or curved surface and may be deformable under stress.

The transparent electrically conductive substrate is generally a laminate comprising a transparent substrate and a transparent electrode layer formed thereon. The reflective electrically conductive substrate may be 1) a laminate comprising a transparent or opaque substrate and a reflective electrode layer formed thereon, 2) a laminate comprising a substrate having a transparent electrode layer on one surface and a reflective electrode layer on the other surface, 3) a laminate comprising a transparent substrate having a reflective layer formed thereon and further a transparent electrode layer formed thereon and 4) a plate-like substrate which itself functions as a reflective layer and an electrode.

No particular limitations is imposed on the transparent substrate which may thus be a color or colorless glass, a reinforced glass and a resin of color or colorless transparency. Specific examples of such a resin include polyethylene terephthalate, polyamide, polysulfone, polyether sulfone, polyether etherketone, polyphenylene sulfide, polycarbonate, polyimide, polymethyl methacrylate and polystyrene.

The term "transparency" used herein designates optical transmission ranging from 1 to 100 percent. The substrate used for the invention has a smooth surface at normal temperature.

There is no particular limitation to the transparent electrode layer as long as it meets the requirements necessary for achieving the purpose of the present invention. Specific examples of the electrode layer include an electrically conductive membrane comprising a thin film of a metal such as gold, silver, chrome, copper and tungsten or a metal oxide such as ITO ($In_2O_3$—$SnO_2$), tin oxide, silver oxide, zinc oxide and vanadium oxide.

The electrode has a thickness in the range of usually 100 to 5,000, preferably 500 to 3,000 angstrom. The surface resistance of the electrode may be selected suitably depending upon the usage and applications but usually in the range of 0.5–500, preferably 1–50 $\Omega/cm^2$.

No particular limitation is imposed on the formation method of the electrode layer. Any suitable conventional methods may be selected depending upon the metal and metal oxide constituting the electrode. In general, the formation of the electrode layer is carried out by vacuum evaporation, ion plating, sputtering and a sol-gel method. The thickness of the electrode layer is selected within the range such that the transparency thereof is not affected. The electrode layer may partially provided with an opaque electrode-activator for the purpose of imparting oxidation-reduction capability, electric conductivity and electric double layer capacitance, the electrode-activator being provided in an amount such that the transparency of the entire electrode layer is not harmed. Electrode activators eligible for the purpose of the invention include a metal such as copper, silver, gold, platinum, iron, tungsten, titanium and lithium, an organic material having oxidation-reduction capability such as polyaniline, polythiophen, polypyrrole and phthalocyanine, a carbon material such as active carbon and graphite and a metal oxide such as $V_2O_5$, $WO_3$, $MnO_2$, NiO and $Ir_2O_3$ and mixtures thereof. These electrode activators may be integrated to the electrode with use of a variety of resins. The opaque electrode activator may applied onto an electrode by forming on an ITO transparent electrode a composition comprising an active carbon fiber, graphite and an acrylic resin into a micro pattern in the shape of stripes or by forming on a thin-film of gold a composition comprising $V_2O_5$, acetylene black and butyl rubber in the shape of a mesh. No particular limitation is imposed on the reflective electrode layer as long as it is stable electrochemically and has a specular surface. Eligible for the reflective electrode layer includes a film of a metal such as gold, platinum, tungsten, tantalum, rhenium, osmium, iridium, silver, nickel and palladium and a film of an alloy such as platinum-palladium, platinum-rhodium and stainless steel. The reflective electrode layer is necessarily disposed onto a substrate or a transparent substrate with the reflectiveness and specularity of the layer maintained. The reflective electrode layer is formed onto a substrate by any suitable conventional methods such as vacuum deposition, ion-plating and sputtering.

There is no particular limitation to a substrate on which the reflective electrode layer is disposed. The substrate may be transparent or opaque. Specific examples of the substrate include those exemplified with respect to the transparent substrate described above, a variety of plastics, resins, glasses, woods and stones.

No particular limitation is imposed on the above-mentioned reflective plate or layer as long as it has a specular surface. Silver, chrome, aluminum and stainless steel can be utilized.

The plate-like substrate having a reflective layer and functioning as an electrode includes the substrates exemplified with respect to the reflective electrode among which are self-supportive.

The ion conductive material used for the inventive electrochromic mirror is disposed so as to be sandwiched between the reflective electrically conductive substrate and the transparent electrically conductive substrate (these substrates are hereinafter referred to as counter-substrates). There is no particular limitation to a method of disposing the ion conductive material between the counter-substrates. The ion conductive material may be injected into the space provided between the substrates which are placed, facing each other and then sealed at the edges of the opposed surfaces, by vacuum injection, atmospheric injection or a meniscus method. Alternatively, the layer of the ion conductive material may be formed on the electrode layer of one of the electrically conductive substrates and then put together with the other electrically conductive substrate. Furthermore, a film-like ion conductive material is inserted between a pair of glasses to form a laminated glass.

The term "ion conductive material" designates materials which can color, bleach and discolor an electrochromic material hereinafter described. The ion conductive material has preferably an ion conductivity of more than $1 \times 10^{-7}$ S/cm at room temperature. No particular limitation is imposed on the ion conductive material, which may thus be liquid, gel or solid. Solid ion conductive materials are particularly preferred for the purpose of the invention thereby obtaining an electrochromic mirror which is overall solid.

Eligible liquid ion conductive materials are those dissolving a supporting electrolyte such as salts, acids and alkalis in a solvent. Any suitable solvents may be used as long as they can dissolve a supporting electrolyte. Preferred are those having polarity. Specific example of such solvents include water and an organic polar solvent such as methanol, ethanol, propylene carbonate, ethylene carbonate, dimethylsulfoxide, dimethoxyethane, acetonitrile, r-butyrolactone, r-valerolactone, sulforan, dimethylformamide, dimethoxyethane, tetrahydrofuran, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, r-butyrolactone, sulforan, dioxolane, dimethylformamide, tetrahydrofuran, adiponitrile, methoxyacetonitrile, dimethylacetoamide, methylpyrrolidinone, dimethylsulfoxide, trimethylphosphate and polyethylene glycol. These may be used singular or in combination.

Although not restricted, salts used as a supporting electrolyte may be alkali metal salts, inorganic ion salts such as alkali earth metal salts, quaternary ammonium salts and cyclic quaternary ammonium salts. Specific examples of such salts include alkali metal salts of lithium, sodium or potassium such as $LiClO_4$, $LiSCN$, $LiBF_4$. $LiAsF_6$, $LiCF_3SO_3$, $LiPF_6$, Lil, NaI, NaSCN, $NaClO_4$, $NaBF_4$, $NaAsF_6$, KSCN and KCl, quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBR$, $(C_2H_5)_4NClO_4$ and $(n-C_4H_9)_4NClO_4$ and mixtures thereof.

Acids used as a supporting electrolyte may be exemplified by inorganic acids and organic acids which include sulfuric acid, hydrochloric acid, phosphoric acid, sulfonic acid carboxylic acid.

Alkalis used as a supporting electrolyte include sodium hydroxide, potassium hydroxide and lithium hydroxide.

The gelatinized-liquid ion conductive material may be those which are gelatinized or made to be viscous by adding a polymer or a gelatinizer to the above-mentioned liquid ion conductive material.

Preferred examples of such a polymer are polyacrylonitrile, carboxymethylcellulose, polyvinyl chloride, polyethylene oxide, polyurethane, polyacrylate, polyamide, polyacrylamide, cellulose, polyester, polypropyleneoxide and nation.

Preferred examples of the gelatinizer are oxyethylenemethacrylate, oxyethyleneacrylate, urethaneacrylate, acrylamide and agar-agar.

There is no particular limitation to the solid ion conductive material if it is solid at room temperature and ion conductive. Preferred examples of such solid ion conductive materials are polyethyleneoxide, the polymer of oxyethylenemethacrylate, nafion, polystyrene sulfonate, $Li_3N$, Na-$\beta$-$Al_2O_3$ and $Sn(HPO_4)_2H_2O$. Particularly preferred are polymer solid electrolytes derived from polymerization of a polyethyleneoxide-based compound, an oxyalkyleneacrylate-based compound or a urethaneacrylate-based compound.

A first example of such polymer solid electrolytes is one derived form the solidification of a composition (hereinafter referred to as Composition A) containing the above-described organic polar solvent and supporting electrolyte and a urethaneacrylate of the formula

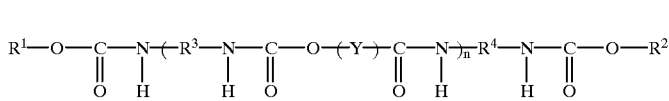
(II)

wherein $R^1$ and $R^2$ may be the same or different and each are a group of formula (III), (IV) or (V), $R^3$ and $R^4$ may be the same or different and each are a $C_1$–$C_{20}$, preferably $C_2$–$C_{12}$ divalent hydrocarbon residue, Y is selected from a polyether unit, a polyester unit, a polycarbonate unit and the mixed unit thereof and n is an integer of 1–100, preferably 1–50, more preferably 1–20.

Formulae (III), (IV) and (V) are represented by

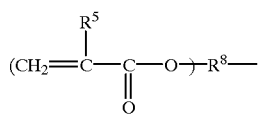
(III)

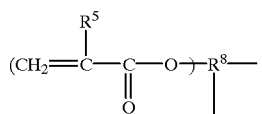
(IV)

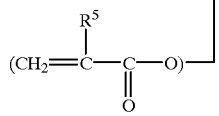

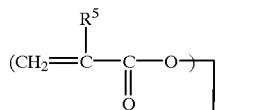

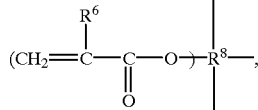
(V)

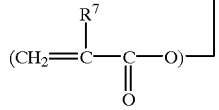

wherein $R^5$, $R^6$ and $R^7$ may be the same or different and each are a hydrogen atom or a $C_1$–$C_3$ alkyl group and $R^8$ is a $C_1$–$C_{20}$, preferably $C_2$–$C_8$ organic residue of divalent through quatervalent.

Such organic residues may be a hydrocarbon residue such as alkyltolyl, alkyltetratolyl and alkylene of the formula

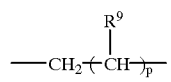
(VI)

wherein $R^9$ is a $C_1$–$C_3$ alkyl group or hydrogen, p is an integer of 0–6 and if p is greater than 2 the groups of $R^9$ may be the same or different.

The hydrocarbon residue may be a group part of which hydrogen atoms are substituted by an oxygen-containing hydrocarbon group such as a $C_1$–$C_6$, preferably $C_1$–$C_3$ alkoxy group and a $C_6$–$C_{12}$ aryloxy group. Specific examples of group $R^8$ in formulae (III) thorough (V) are those represented by the following formulae:

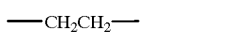

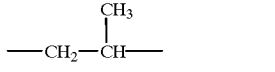

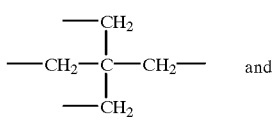 and

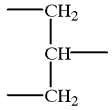

Each of the divalent hydrocarbon residues represented by $R^3$ and $R^4$ in formula (II) is exemplified by a divalent chain-like hydrocarbon group, an aromatic hydrocarbon group and an alicyclic-containing hydrocarbon group. Specific examples of the chain-like divalent hydrocarbon group are those represented by formula (VI).

Specific examples of the aromatic hydrocarbon group and alicyclic-containing hydrocarbon group are those represented by the following formulae:

(VII)

(VIII)

and

(IX)

wherein $R^{10}$ and $R^{11}$ may be the same or different and each are a phenylene group, a phenylene group having an alkyl subsutituent, a cycloalkylene group and a cycloalkylene group having an alkyl substituent, $R^{12}$, $R^{13}$, $R^{14}$ and $R^{15}$ may be the same or different and each are a hydrogen atom or a $C_1$–$C_3$ alkyl group and q is an integer of between 1 and 5.

Specific examples of the groups $R^3$ and $R^4$ in formula (II) are those represented by the following formulae:

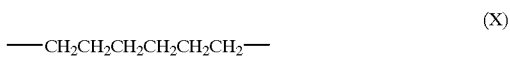
(X)

 (XI)

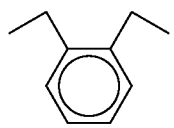 (XII)

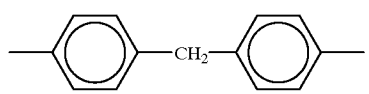 (XIII)

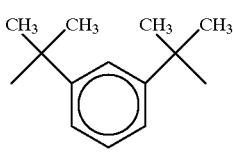 (XIV)

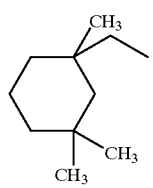 (XV)

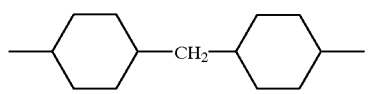 (XIII)

In formula (II), Y indicates a polyether unit, a polyester unit, a polycarbonate unit and mixed unit thereof. Each of these units is represented by the following formulae:

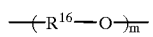 (a)

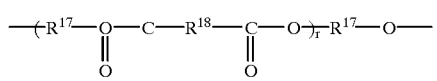 (b)

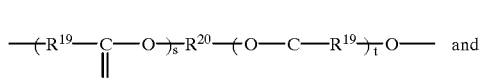 and (c)

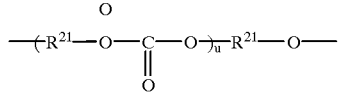

wherein $R^{16}$ through $R^{21}$ may be the same or different and each are a $C_1$–$C_{20}$, preferably $C_2$–$C_{12}$ divalent hydrocarbon residue, $C_1$–$C_6$ being particularly preferred for $R^{21}$, m is an integer of 2–300, preferably 10–200, r is an integer of 1–300, preferably 2–200, s is an integer of 1–200, preferably 2–100, t is an integer of 1–200, preferably 2–100 and u is an integer of 1–300, preferably 10–200.

$R^{16}$ through $R^{21}$ are preferably straight or branched alkylene groups among which methylene, ethylene, trimethylene, tetramethylene, pentamethylene, hexamethylene and propylene groups are preferred for $R^{18}$, and ethylene and propylene groups are preferred for $R^{16}$, $R^{17}$ and $R^{19}$ through $R^{21}$.

Each unit represented by formulae (a) through (d) may be a copolymer of the same or different units. In other words, if there exist a plurality of the groups of each $R^{16}$ through $R^{21}$, the groups of each $R^{16}$, $R^{17}$, $R^{18}$, $R^{19}$, $R^{20}$ and $R^{21}$ may be the same or different. Preferred examples of such copolymers include a copolymer of ethylene oxide and a copolymer of propylene oxide.

The urethaneacrylate of formula (II) has a molecular weight in the range of 2,500–30,000, preferably 3,000–20,000.

The urethaneacrylate has preferably 2–6, more preferably 2–4 functional groups per molecule.

The urethaneacrylate may be prepared by any suitable conventional methods.

The organic polar solvent is added in an amount of 100–200, preferably 200–900 weight parts per 100 parts of the urethaneacrylate. Too less amount of adding the organic polar solvent results in insufficient ion conductivity, while too much amount causes a reduction in mechanical strength.

No particular limitation is imposed on the supporting electrolyte as long as it is not obstructive in achievement of the purpose of the invention. Preferred are those already exemplified above. The supporting electrolyte should be added in an amount of 0.1–30, preferably 1–20 weight percent of the organic polar solvent.

Composition (A) is essentially obtained by solidifying the urethaneacrylate, the organic nonaqueous solvent and the supporting electrolyte. If necessary, Composition (A) may be added with any suitable components as long as they are not obstructive to the achievement of the purpose of the invention. Such components may be crosslinkers and polymerization initiators.

The solid polymeric electrolyte of the first example may be inserted between the electrically conductive substrates disposed, facing each other by injecting Composition (A) into a selected space between the substrates in a conventional manner and curing the same. The term "curing" used herein designates a state where polymerizing or crosslinking component is cured with the progress of polymerization (polycondensation) or crosslinking and thus the composition does not flow at room temperature. The composition thus cured has the basic structure in the form of network.

A second example of the polymeric solid electrolyte is obtained by solidifying Composition (B) comprising an organic polar solvent, a supporting electrolyte, a polyfunctional acryloyle-modified polyalkylene oxide and a mono-poly-functional acryloyle-modified polyalkylene oxide represented by the formula

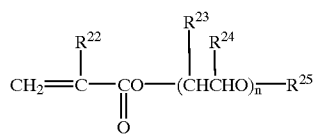 (XVII)

wherein $R^{22}$, $R^{23}$, $R^{24}$ and $R^{25}$ may be the same or different and each are hydrogen and an alkyl group having 1–5 carbon atoms and n is an integer of greater than 1.

Specific examples of such alkyl group include methyl, ethyl, i-propyl, n-propyl, n-butyl, t-butyl and n-pentyl. Preferred for $R^{22}$, $R^{23}$ and $R^{24}$ are hydrogen and a methyl group. Preferred for $R^{25}$ are hydrogen, a methyl and ethyl group.

n in formula (XVII) is an integer of greater than 1, usually between 1 and 100, preferably 2 and 50, more preferably 2 and 30.

Specific examples of compounds represented by formula (XVII) are those having 1–100, preferably 2–50, more preferably 1–20 oxyalkylene units, such as methoxypolyethylene glycol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof.

If n is greater than 2, the compound may be those having different oxyalkylene units, that is, copolymerized oxyalkylene units which for instance have 1–50, preferably 1–20 oxyethylene units and 1–50, preferably 1–20 oxypropylene units. Specific examples of such compounds are (ethylene. propylene) glycol methacrylate, ethoxypoly (ethylene.propylene) glycol methacrylate, methoxypoly (ethylene.propylene) glycol methacrylate, methoxypoly (ethylene.propylene) glycol acrylate, ethoxypoly methoxypoly (ethylene.propylene) glycol acrylate and mixtures thereof.

The polyfunctional acryloyl-modified polyalkylene oxide may be a bifunctional acryloyl-modified polyalkylene oxide represented by the formula

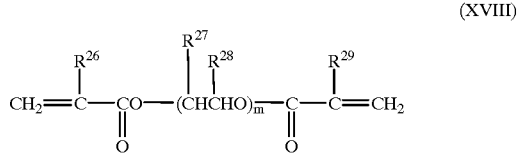

(XVIII)

wherein $R^{26}$, $R^{27}$, $R^{28}$ and $R^{29}$ each are hydrogen and a $C_1$–$C_5$ alkyl group and m is an integer of greater than 1; or a polyfunctional acryloyl-modified polyalkylene oxide having more than three functional groups represented by the formula

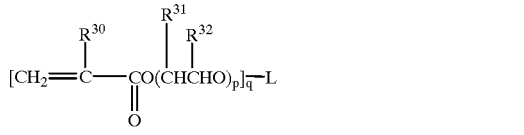

(XIX)

wherein $R^{30}$, $R^{31}$ and $R^{32}$ each are hydrogen and a $C_1$–$C_5$ alkyl group, p is an integer of greater than 1, q is an integer of 2–4 and L is a connecting group of valence indicated by q.

Preferred alkyl groups for $R^{26}$, $R^{27}$, $R^{28}$ and $R^{29}$ are methyl, ethyl, i-propyl, n-propyl, n-butyl, t-butyl, t-butyl and n-pentyl among which hydrogen and methyl are particularly preferred.

m in formula (XVIII) is an integer of greater than 1, usually 1–100, preferably 2–50, more preferably 2–30. Preferred examples of compounds of formula (XVIII) are those having 1–100, preferably 2–50, more preferably 1–20 oxyalkylene units such as polyethylene glycol diacrylate, polypropylene glycol dimethacrylate, polyethylene glycol diacrylate, polypropylene glycol dimethacrylate and mixtures thereof.

If m is greater than 2, the compounds of formula (XVIII) may be those having different oxyalkylene units, that is, polymerized oxyalkylene unit having 1–50, preferably 1–20 oxyethylene units and 1–50, preferably 1–20 oxypropylene units, such as poly(ethylene.propylene)glycol dimethacrylate, poly(ethylene.propylene)glycol diacrylate and mixtures thereof.

Preferred alkyl groups for $R^{30}$, $R^{31}$ and $R^{32}$ are methyl, ethyl, i-propyl, n-propyl, n-butyl, t-butyl and n-pentyl. Particularly preferred are hydrogen and a methyl group.

p is an integer of greater than 1, usually between 1 and 100, preferably 2 and 50, more preferably 2 and 30.

q is a number of connecting group "L" and an integer of between 2 and 4.

Connecting group "L" is a divalent, trivalent or quatravalent hydrocarbon group having 1–30, preferably 1–20 carbon atoms.

Such divalent hydrocarbon groups may be alkylene, arylene, arylalkylene, alkylarylene and hydrocarbon groups having those groups as the base skeleton. Specific examples of such hydrocarbon groups are those represented by the following formulae:

—$CH_2$—

—$CH_2CH_2$— and

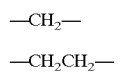

(Bz represent a benzene ring).

Such trivalent hydrocarbons groups may be alkyltryl, aryltryl, arylalkyltryl, alkylaryltryl and hydrocarbon groups having those groups as the base skelton. Specific examples of such hydrocarbon groups are those represented by the following formulae:

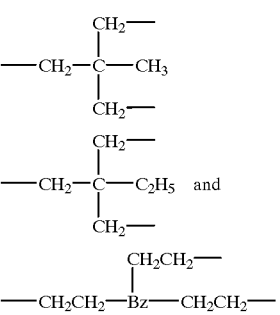

(Bz represents a benzene ring).

Specific examples of compounds of formula (XIX) are those having 1–100, preferably 2–50, more preferably 1–20 of an oxyalkylene units such as
trimethylolpropanetri(polyethylene glycol acrylate),
trimethylolpropanetri (polyethylene glycol methaacrylate),
trimethylolpropanetri (polypropylene glycol acrylate),
trimethylolpropanetri (polypropylene glycol methaacrylate),
tetramethylolmethanetetra(polyethylene glycol acrylate),
tetramethylolmethanetetra (polyethylene glycol methaacrylate)
tetramethylolmethanetetra(polypropylene glycol acrylate),
tetramethylolmethanetetra(polypropylene glycol methaacrylate),
2,2-bis[4-(acryloxypolyethoxy)phenyl]propane,
2,2-bis[4-(methaacryloxypolyethoxy)phenyl]propane, 2,2-bis[4- (acryloxypolyisopropoxy)phenyl]propane,
2,2-bis[4- (methaacryloxypolyisopropoxy)phenyl]propane and mixtures thereof.

If p is more than 2, compounds of formula (XIX) may be those having different oxyalkylene units, that is, polymerized oxyalkylene units having 1–50, preferably 1–20 of oxyethylene units and 1–50, preferably 1–20 oxypropylene units. Specific examples of such compounds include trimethylolpropanetri(poly(ethylene.propylene)glycol acrylate), trimethylolpropanetri(poly(ethylene.propylene) glycol methaacrylate), tetramethylmethanetetra(poly (ethylene.propylene)glycol acrylate), tetramethylolmethanetetra(poly(ethylene.propylene)glycol acrylate) and mixtures thereof.

Needless to mention, there may be used the difunctional acryloyl-modified polyalkyleneoxide of formula (XVIII) and the polyfunctional acrylo-modified polyalkyleneoxide of formula (XIX) in combination. When these compounds are used in combination, the weight ratio of the compound of formula (XVIII) to that of formula (XIX) is in the range between 0.01/99.9 and 99.9/0.01, preferably 1/99 and 99/1, more preferably 20/80 and 80/20. The weight ratio of the compound of formula (XVII) to the polyfunctional acryloyl-modified polyalkyleneoxide is in the range of usually between 1/0.001 and 1/1, preferably 1/0.05 and 1/0.5.

The above-described organic polar solvent should be added in an amount of 50–800, preferably 100–500 weight percent based on the total weight of the compound of formula (XVII) and the polyfunctional acryloyl-modified polyalkyleneoxide.

The above-described supporting electrolyte should be added in an amount of 1–30, preferably 3–20 weight percent based on the total weight of the compound of formula (XVII), the polyfunctional acryloyl-modified polyalkyleneoxide and the organic polar solvent.

If necessary, Composition (B) may be added with another components optionally as long as they do not give adverse effect on the inventive electrochromic mirror. Although not restricted, such components may be photopolymerization initiators or thermal polymerization initiators. These initiators should be added in an amount of 0.05–5, preferably 0.01–3 weight percent based on the total weight of the compound of formula (XVII) and the polyfunctional acryloyl-modified polyalkylene oxide.

The polymeric solid electrolyte described above as a second example may be inserted between electrically conductive substrates facing each other by injecting Composition (B) into a selected site therebetween by any suitable method. The "curing" used herein designates a state where a polymerizable or crosslinkable component such as monofunctional or polyfunctional acryloyl-modified polyalkyleneoxide is cured with the progress of polymerization or crosslinking and hence the composition entirely stays unfluidized. In this case, the monofunctional or polyfunctional acryloyl-modified polyalkyleneoxide has the basic structure in the form of networks.

Needless to mention, ion conductive materials other than the above exemplified are also eligible.

Description will now be made in detail of a compound used as the electrochromic chromogenic layer of the electrochromic mirror according to the invention which compound has a viologen structure represented by the formula

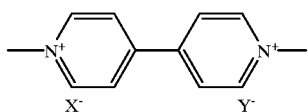

(I)

wherein $X^-$ and $Y^-$ indicate counter anions and may be the same or different and selected from the group consisting of a halogen anion, $ClO_4^-$, $CH_3COO^-$ and $CH_3(C_6H_4)SO_3^-$. The halogen anion may be $F^-$, $Cl^-$, $Br^-$ and $I^-$.

No limitation is imposed on the viologen structure-containing compound as long as it possesses electrochromic properties. Such compounds are exemplified by high molecular compounds having the viologen structural unit or units containing the viologen structure as repeating units, a high molecular weight substituent at the terminal end of the viologen structure or molecular chains part of which is substituted with a group having the viologen structure; and low molecular compounds having the viologen structure. The compound having the viologen structure-repeating units may be that having the viologen structure in the side chain or in the main chain. There is no limitation to repeating units in the main chain of such a compound having the viologen structure in the side chain. Such repeating units may be hydrocarbon units, oxygen-containing units, nitrogen-containing units, polysiloxane units and copolymerized units thereof.

The compound having the viologen structure may be a polymer or copolymer represented by the formula

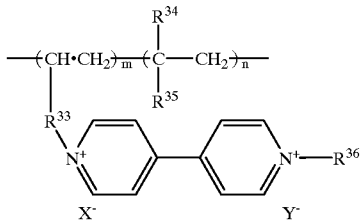

(XX)

wherein m is an integer of more than 1, preferably between 1 and 1,000, n is an integer of more than 0, preferably between 0 and 1,000, $R^{33}$ is a $C_1$–$C_{20}$, preferably $C_1$–$C_{12}$ divalent hydrocarbon residue or merely indicates the bond of the viologen group directly to a polymer chain not through the hydrocarbon residue, namely covalently bond, $R^{34}$, $R^{35}$ and $R^{36}$ each are a $C_1$–$C_{20}$, preferably $C_1$–$C_{12}$ hydrocarbon group and a hetero atom-containing substituent and a halogen atom and $X^-$ and $Y^-$ indicate counter anions with respect to viologen and may be same or different.

The divalent hydrocarbon may be a hydrocarbon group and an oxygen-containing hydrocarbon group. Specific examples of the hydrocarbon group include an aliphatic hydrocarbon group such as methylene, ethylene, propylene, tetramethylene, pentamethylene and hexamethylene and an aromatic hydrocarbon such as phenylene, biphenylene and benzylidene. Specific examples of the oxygen-containing hydrocarbon group include an aliphatic alkoxylene group such as $-OCH_2-$, $-OCH_2CH_2-$ and $-OCH_2CH_2CH_2-$, an aliphatic dialkoxylene group such as $-OCH_2CH_2O-$ and $-OCH_2CH_2CH_2O-$, an aromatic aryloxy group such as $-O(C_6H_4)-$ and $-OCH_2(C_6H_4)-$ and an aromatic diaryloxy group such as $-O(C_6H_4)O-$ and $-OCH_2(C_6H_4)O-$.

Specific examples of $X^-$ and $Y^-$ include a halogen anion such as $F^-$, $Br^-$ and $I^-$, $ClO_4^-$, $CH_3COO^-$ and $CH_3(C_6H_4)SO_3^-$.

Preferred hydrocarbon groups for $R^{34}$, $R^{35}$ and $R^{36}$ are an alkyl group such as methyl, ethyl, propyl and hexyl and an aryl group such as phenyl, tryl, benzyl and naphtyl. Preferred hetero atom-containing substituents are a $C_1$–$C_{20}$, preferably $C_1$–$C_{12}$ oxygen-containing hydrocarbon group, amide, amino and cyano groups. Such oxygen-containing hydrocarbon groups include an alkoxyl group such as methoxy and ethoxy an aryloxy group such as phenoxy and triloxy, a carboxyl group and a residual carboxylic acid ester.

In the case where the compound of formula (XX) is a copolymer, it may have the repeating units the mode of which polymerization is block-, random- or alternate.

The compound having the viologen structure may also be a polymer or copolymer represented by the formula

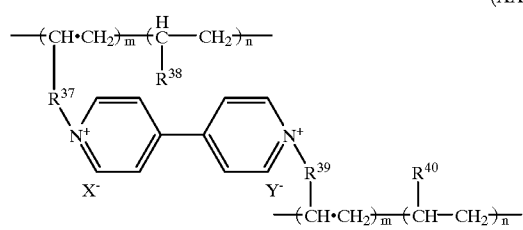

(XXI)

wherein m, n and $X^-$ and $Y^-$ are the same as defined in formula (XX), n being preferably 0, $R^{37}$ and $R^{39}$ may be the same or different and each are the same as those as defined with respect to $R^{33}$ in formula (XX) and $R^{38}$ and $R^{40}$ may the same or different and each are the same as those as defined with respect to $R^{34}$ in formula (XX).

In the case of the compound of formula (XXI) is a copolymer, it may have the repeating units the mode of which polymerization is block, random or alternate.

Moreover, the compound having the viologen structure may also be a polymer or copolymer represented by the formula

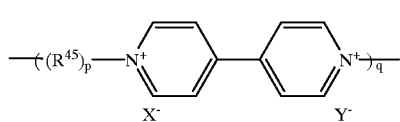

(XXII)

wherein m, n and $X^-$ and $Y^-$ are the same as defined in formula (XX), n being preferably 0, $R^{41}$ is the same as those as defined with respect to $R^{33}$ in formula (XX) and $R^{42}$, $R^{43}$ and $R^{44}$ may be the same or different and each are the same as those as defined with respect to $R^{34}$ in formula (XX).

In the case of the compound of formula (XXII) is a copolymer, it may have the repeating units the mode of which polymerization is block, random or alternate.

Furthermore, the compound having the viologen structure may be a copolymer represented by the formula

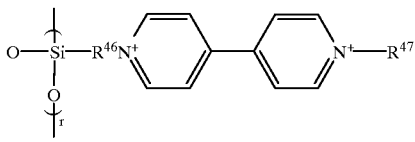

(XXIII)

wherein p is an integer of more than 0, preferably between 0 and 20, q is an integer of 0–1,000 and $R^{45}$ is the same as those as defined with respect to $R^{33}$ in formula (XX).

Further alternatively, the compound having the viologen structure may also be a polymer or copolymer of the formula (XXIV)

wherein r is an integer of more than 1, preferably between 1 and 1,000, $R^{46}$ is the same as those as defined with respect to $R^{33}$ in formula (XX) and $R^{47}$ is the same as those as defined with respect to $R^{33}$ in formula (XX).

The typical examples of the compound having viologen structure used for the present invention has been exemplified by the compounds of formulae (XX) through (XIV). The specific examples of compounds which are included within the range of these formulae and which are not but eligible for the invention are give below.

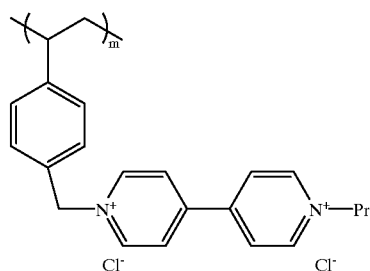

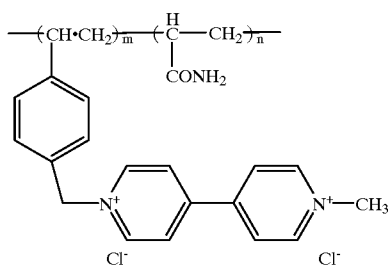

-continued
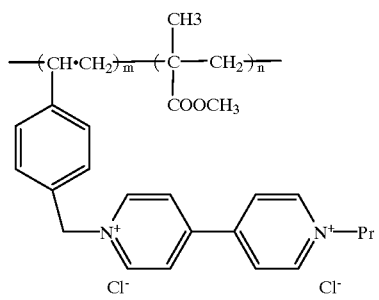
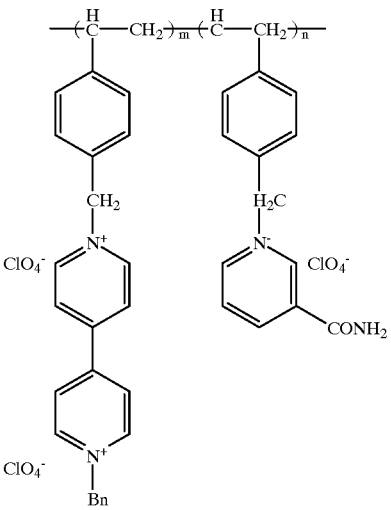
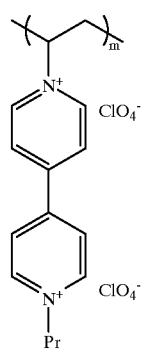
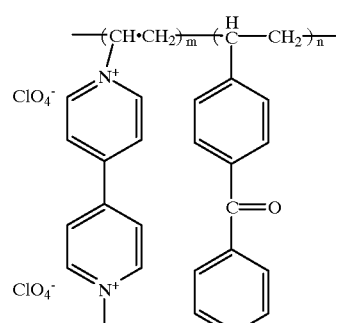
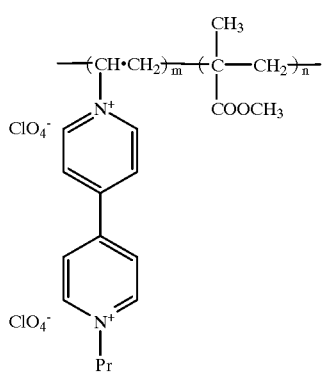
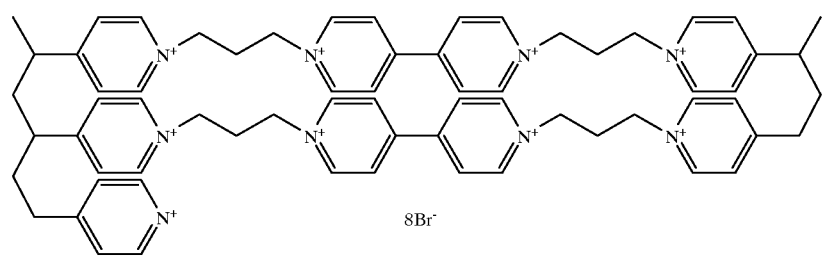
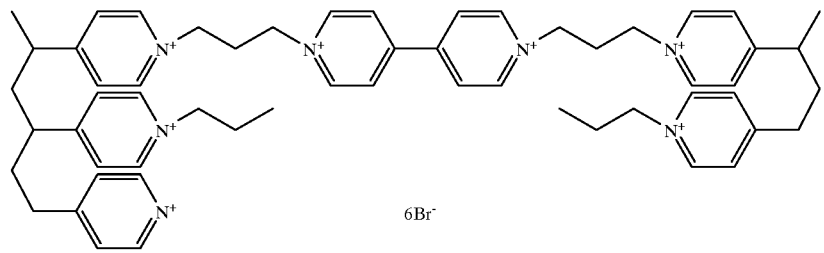

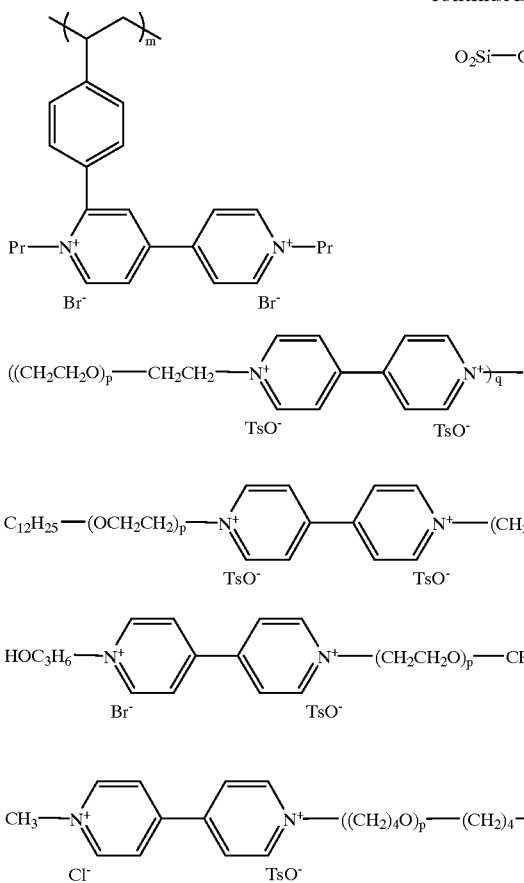

The electrochromic chromogenic layer used for the present invention essentially contains the compound having a viologen structure represented by formula (I), but is usually formed from this compound only. The electrochromic chromogenic layer can be obtained by forming the membrane or film of the compound onto the above-described electrically conductive substrate. Although no particular limitation is imposed on the method for the formation of such a membrane or film, the membrane or film may be formed by drying the solution which has been obtained by dissolving the chromogenic compound in a solvent and coated onto the electrically conductive substrate or by cooling the chromogenic compound which has been melted on heating and casted over the substrate, the former being particularly preferred.

The solvent used for the former method may be any types of solvents as long as they can dissolve the chromogenic compound and evaporate after being coated. Specific examples of the solvent include dimethylsulfoxide, dimethylacetamide, dimethylformamide, N-methylpyrrolidone, γ-valerolactone, dimethoxyethane, acetnitrile, propionnitrile, tetrahydrofuran, dioxane, methanol, ethanol, propanol, chloroform, toluene, benzene, nitrobenzene and dioxolane.

There may be employed any suitable coating method such as cast coating, spin coating, dip coating, spray coating, blade coating and flow coating.

The electrochromic chromogenic layer thus formed is easily colored and bleached by oxidation-reduction reaction caused by applying an electrical voltage.

The electrochromic chromogenic layer has a thickness in the range of 0.01–50 μm, preferably 0.1–20 50 μm.

If necessary, the compound having the viologen structure of formula (I) may be added with a compound which can facilitating coloration.

As described above, the electrochromic mirror according to the invention comprises a reflective electrically conductive substrate, a transparent electrically conductive substrate, an ion conductive layer disposed therebetween and at least one electrochromic chromogenic layer disposed either between the reflective electrically conductive substrate and the ion conductive layer or between the transparent electrically conductive substrate and the ion conductive layer, the electrochromic chromogenic layer containing a compound having a viologen structure represented by formula (I). The basic arrangement of these components of the inventive mirror will be described below.

FIG. 1 through 4 show the typical arrangements of the components of the inventive electrochromic mirror.

The electrochromic mirror (10) shown in FIG. 1 comprises a first laminate comprising a transparent electrically conductive substrate including a transparent substrate (11) and the layer of a transparent electrode (12) formed on one surface of the substrate and an electrochromic chromogenic layer (13) formed on the electrode layer (12); a second laminate comprising a reflective electrically conductive substrate including a transparent or opaque substrate (17) and a reflective electrode layer (16) formed thereon; and an ion conductive layer disposed in sandwich relation in the space properly provided between the first and second laminates which are placed so that the electrochromic chromogenic layer (13) and the reflective substrate (16) face each other.

Figure 2:
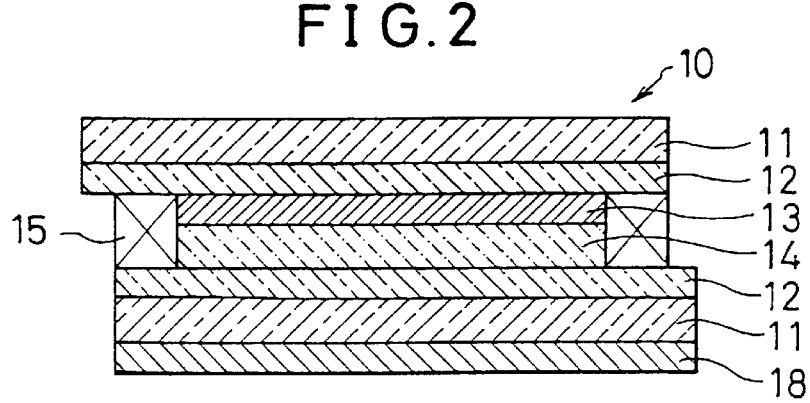
FIG. 2 is a cross-sectional view of an electrochromic mirror according to a second embodiment of the invention.

The another example of the electrochromic mirror (10) shown in FIG. 2 comprises a first laminate comprising a transparent electrically conductive substrate including a transparent substrate (11) and a layer of a transparent electrode (12) formed on one surface of the substrate and an electrochromic chromogenic layer (13) formed on the electrode layer (12); a second laminate comprising a transparent substrate (11) having a transparent electrode layer (12) formed on one surface of the substrate and a reflective layer (18) formed on the other surface; and an ion conductive material (14) disposed in sandwich relation in the space properly provided between the first and second laminates which are placed so that the electrochromic chromogenic layer (13) and the transparent electrode layer of the second laminate (16) face each other.

Figure 3:
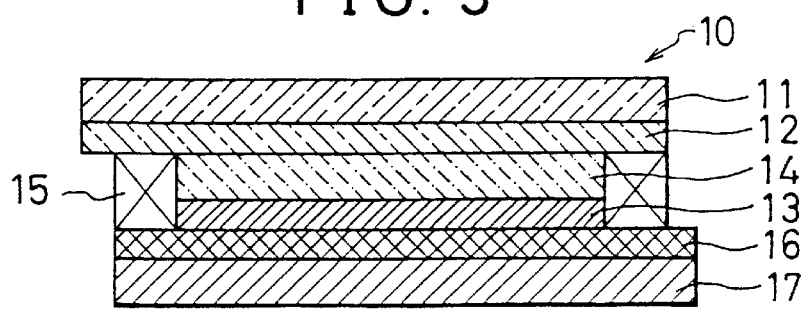
FIG. 3 is a cross-sectional view of an electrochromic mirror according to a third embodiment of the invention.

The electrochromic mirror shown in FIG. 3 comprises a first laminate comprising a transparent electrically conductive substrate including a transparent substrate (11) and a transparent electrode layer (12) formed on one surface of the substrate; a second laminate comprising a transparent or opaque substrate (17) having a reflective electrode layer (16) formed thereon and an electrochromic chromogenic layer (13) formed on the reflective electrode layer (16); and an ion conductive material (14) disposed in sandwich relation in the space properly provided between the first and second laminates which are placed so that the transparent electrode layer and the electrochromic chromogenic layer (13) face each other.

Figure 4:
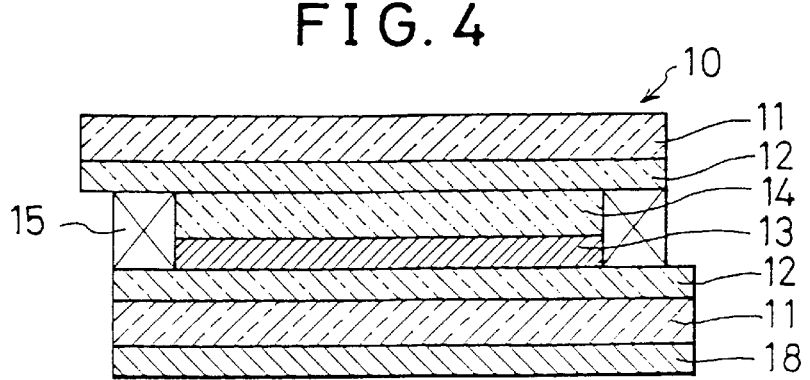
FIG. 4 is a cross-sectional view of an electrochromic mirror according to a forth embodiment of the invention.

FIG. 4 shows another example of the inventive electrochromic mirror (10) comprises a first laminate including a transparent substrate (11) having a transparent electrode layer (12); a second laminate including a transparent substrate (11) having a transparent electrode layer (12) and an electrochromic chromogenic layer (13) formed one after another on one surface and a reflective layer formed on the other surface; and an ion conductive material (14) disposed in sandwich relation in the space properly provided between the first and second laminates which are placed so that the transparent electrode layer of the first laminate and the electrochromic chromogenic layer (13) of the second laminate face each other.

Needless to mention, each of the electrochromic mirrors shown in FIG. 1 thorough 4 can be colored or bleached by electrochromic phenomenon brought by an electric voltage applied over each electrode. An electric voltage can be applied by any conventional methods.

There is no particular limitation to a method for forming each of the layers or films of the inventive electric mirror. Each of the layers or films can be formed in accordance with the methods described above. Taking an example from the electrochromic mirror shown in FIG. 1, the transparent electrode layer (12) is formed on the transparent substrate (11) by the above-described method and then the electrochromic chromogenic layer (13) is formed on the electrode layer (12) thus formed therby obtaining a laminate (referred to as laminate A). Another laminate (referred to as laminate B) is obtained by forming a reflective electrode layer (16) on a substrate (17) in accordance with the procedure described above. Laminates A and B are placed, facing each other and spaced 1–1,000 μm apart and sealed at their edges with a sealant (15), leaving a portion used for an inlet, thereby forming a empty cell. An ion conductive material or the precursor thereof is injected from the inlet into the cell in a manner described above so as to form the layer of the ion conductive material thereby producing an electrochromic mirror.

When laminates A and B are placed, facing each other, a spacer may be inserted therebetween so as to provide the space retained constantly. No particular limitation is imposed on such a spacer. There may be used one in the form of beads and a sheet. The spacer may be inserted between the electrically conducted substrates facing each other or provided by forming the protrusions of an insulate material of the electrode on an electric conductive substrate.

The ion conductive material layer may be formed by injecting the precursor thereof the space between the electrically conductive substrates facing each other and curing the same. No particular limitation is imposed on a method for curing the precursor. Therefore, the precursor may be cured by lightning, on heating or by injecting a reactive liquid which cures with the progress of time before the precursor being injected. The inlet of the cell may be sealed suitably after completion of the injection of the precursor of the ion conductive material.

Alternatively, a transparent electrode layer (17), an electrochromic chromogenic layer (13) and an ion conductive layer (14) are formed one after another in the order of mentioned in the above-described manner thereby forming a laminate (referred to as laminate A'). Another laminate (referred to as laminate B') is obtained by forming a reflective electrically conductive layer (16) on a substrate (17). Laminates A' and B' are placed, facing each other so that the ion conductive material layer of laminate A' contacts the reflective electrically conductive of laminate B' and then sealed at their edges with a sealant (15).

The electrochromic mirror shown in FIG. 2 may be obtained by forming a transparent electrode layer (12) on one surface of a transparent substrate (11) and a reflective layer on the other surface and then following the same procedure as described for the electrochromic mirror shown in FIG. 1.

The electrochromic mirrors shown in FIGS. 3 and 4 can be produced by following the same procedure as described for those shown in FIGS. 1 and 2.

Although FIGS. 1 through 4 illustrate the typical examples of the structure of the inventive electrochromic mirror, it is not limited to these structures and thus may contain additional components. Such additional components may be an ultraviolet blocking layer such as an ultraviolet reflective layer and an ultraviolet absorbing layer and an overcoat layer provided to protect the mirror entirely or the surface of each of the films or layers. The ultraviolet blocking layer is preferably disposed on the outer side of a transparent substrate (11) or on a transparent electrode layer formed on the transparent substrate. The overcoat layer is preferably disposed on the outer side of a transparent substrate (11) or the outer side of a reflective layer (18).

The electrochromic mirror according to the invention is quick in response and possesses sufficient durability and is excellent memory function due to the electrochromic chromogenic layer containing a specific compound. Furthermore, the use of such an electrochromic chromogenic layer leads to the production of the inventive electrochromic mirror with ease and at low cost. The inventive mirror is advantageous because the density of coloration thereof can be adjusted easily by changing the specifications of the compound contained in the electrochromic chromogenic layer. Furthermore, in the present invention, it is possible to produce a mirror having a large size and improved in safety due to the capability of using a solid electrolyte as an ion conductive material layer which is free from scattering.

With the forgoing advantage in view, the inventive electrochromic chromogenic mirror is useful for an antiglare mirror for an automobile or decorative mirror for illumination.

The present invention will now be explained in further detail with reference to Examples, which are given only by way of illustration an are not intended for limiting the invention.

EXAMPLE 1

(1) Synthesis of Electrochromic Compound

A 100 ml three-necked flask was charged with 5 grams (12.9 mmol) of N-methyl-p-styrylbipyridyl, 0.92 gram (13 mmol) of acrylamide and 30 ml pure water. The mixture was stirred with a magnetic stirrer and heated to 50° C. after being added with 0.1 ml of an aqueous solution containing 30% hydrogen peroxide. After 12 hours the reaction solution was added to acetone in order to precipitate a polymer. The polymer thus obtained had an average molecular weight of 3,500 and a structure represented by the formula given below in which m and n each are about 7.5.

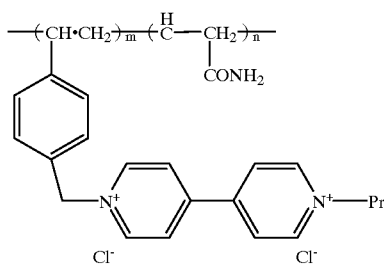

(2) Preparation of Electrochromic Mirror

The compound produced in (1) was dissolved in dimethylformamide to make the 10% solution, by weight, of the compound. The solution was applied onto the ITO(indium tin oxide)-coated surface of a glass substrate. The glass substrate was heated on a hot plate to remove nitrobenzene and then had the thin film (thickness of 5 μm) of the copolymer formed thereon, thereby obtaining a transparent electrically conductive substrate with an electrochromic layer (designated as Laminate A).

A substrate having a platinum film formed thereon was used as a high reflective electrode (designated as Laminate B). On the edges of the platinum-film side of the Laminate B except for a portion forming an inlet for injecting the solution of an electrolyte precursor, an epoxy-based adhesive was applied in the form of a line. Laminate A was superimposed on Laminate B such that the electrochromic layer and the platinum electrode layer face each other and then pressurized so as to cure the adhesive, thereby obtaining an empty cell with an inlet.

Separately from these procedure, 0.4 gram of lithium perchlorate was added to the mixed solution of 1.0 gram of methoxypolyethylene glycol monomethacrylate (oxyethylene unit thereof is 4 in number) manufactured by Shin Nakamura Chemical Industry Co., Ltd under the name of ME04, 0.02 gram of polyethylene glycol dimethacrylate (oxyethylene unit thereof is 9 in number) manufactured by Shin Nakamura Chemical Industry Co., Ltd under the name of 9G and 4.0 grams of γ-butylolactone. The resulting mixture was added with 0.02 gram of 1-(4-isopropylphenyl)-2-hydroxy-2-methylpropane-1-on (manufactured by Melk Co,. Ltd, under the name of "Diecure-1116") as a photopolymerization initiator in a dark room and then injected into the above-obtained cell through the inlet after being deaerated.

After the inlet was sealed with an epoxy-based sealant, the electrolyte precursor in the cell was cured by being exposed to fluorescent through the trasnparent substrate to form a solid electrolyte, thereby obtaining a all solid type electrochromic mirror.

The mirror when assembled was not colored and had a reflectance of 85%. Upon application of an electric voltage, the mirror was quick in response and excellent in electrochromic properties. The mirror was colored upon application of voltage of 1.5 V and was 10% in reflectance with respect to 633 nm wavlength light. After 100 hours, the mirror still was colored and 10% in reflectance.

EXAMPLE 2

(1) Synthesis of Electrochromic Compound 4-(4'-bipyridine)pyridiniumbromide was reacted with 1,2-dibromoethane in dimetylformamide at a temperature of 100° C. thereby obtaining 1-propyl-1'-bromoethyl-4,4'-bipyridiumbromide. This reaction mixture was subjected to elimination of HBr with use of an NAOH solution, thereby obtaining 1-propyl-1'-vinyl-4,4'-bipyridiumbromide.

The monomer thus obtained was subjected to bulk polymerization using di-t-butylperoxide as a catalyst at a temperature of 130° C. thereby obtaining a polymer having an average molecular weight of about 4,000 and a structure represented by the following formula wherein an is about 10.

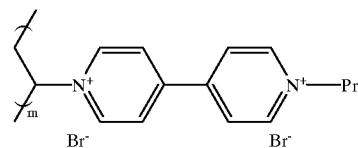

(2) Preparation of Electrochromic Mirror

The compound produced in procedure (1) was dissolved in nitrobenzene to make the 10% solution, by weight, of the compound. The solution thus obtained was applied onto the platinum-film-formed side (reflective electrode side) of Laminate B as used in Example 1 and then heated on a hot plate to remove nitrobenzene thereby obtaining a reflective electrically conductive substrate (designated as Laminate C) with the layer of the electrochromic thin film of the compound having a thickness of 5 μm.

A glass substrate with an electrically conductive layer of palladium was used as a transparent electrically conductive substrate (designated as Laminate D). An epoxy-based resin was applied in the form of lines on the edges other than a portion forming an inlet of an electrolyte precursor solution, of Laminate D. Laminate C was superposed on Laminate D such that the electrochromic layer faced the transparent electrode layer while being pressed to cure the adhesive thereby to provide an empty cell with an inlet.

Separately from these procedures, 0.4 gram of lithium perchlorate was added to the mixed solution of 1.0 gram of methoxypolyethylene glycol monomethacrylate (oxyethylene unit thereof is 4 in number) manufactured by Shin Nakamura Chemical Industry Co., Ltd under the name of ME04, 0.02 gram of polyethylene glycol dimethacrylate (oxyethylene unit thereof is 9 in number) manufactured by Shin Nakamura Chemical Industry Co., Ltd under the name of 9G and 4.0 grams of γ-butylolactone thereby obtaining a homogeneous solution. The solution thus obtained was added with 0.02 gram of 1-(4-isopropylphenyl)-2-hydroxy-2-methylpropane-1-on (manufactured by Melk Co,. Ltd, under the name of "Diecure-1116" as a photopolymerization initiator in a dark room and then injected into the above-obtained cell through the inlet after being deaerated.

After the inlet port of the cell was sealed with an epoxy-based adhesive, the precursor of the electrolyte was cured by being exposed to a fluorescent through the transparent substrate to form a solid electrolyte layer, thereby obtaining an all solid type electrochromic mirror as shown in FIG. 3.

Upon completion of assembling the mirror, it is not colored and 85% in reflectance. Upon application of electric voltage, the mirror was quick in response and excelled in electrochromic properties. More specifically, when an electric voltage of 1.5 V was applied to the mirror, it is colored and 15% in reflectance. Even after the application of such electric voltage was terminated, the mirror was still kept colored and 10% in reflectance 100 hours later.

What is claimed is:

1. An all-solid type electrochromic mirror comprising a reflective electrically conductive substrate, a transparent electrically conductive substrate, a layer of a solid ion conductive material, said solid ion conductive material disposed between said reflective electrically conductive substrate and said transparent electrically conductive substrate, and at least one electrochromic chromogenic layer disposed either between said ion conductive material layer and said reflective electrically conductive substrate or between said ion conductive material layer and said transparent electrically conductive substrate, wherein said ion conductive material comprises a polymer solid electrolyte derived from the polymerization of a compound selected from polyethyleneoxide-based compounds, oxyalkyleneacrylate-based compounds and urethaneacrylate-based compounds, and wherein said electrochromic chromogenic layer contains a compound having a viologen structure selected from polymers and copolymers represented by the formula

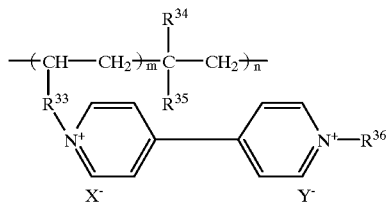

(XX)

wherein m is an integer of more than 1, n is an integer of more than 0, $R^{33}$ is a $C_1-C_{20}$ divalent hydrocarbon residue, $R^{34}$, $R^{35}$ and $R^{36}$ are each independently a $C_1-C_{20}$ hydrocarbon group, a hetero atom-containing substituent, or a halogen atom, and $X^-$ and $Y^-$ represent counter anions selected from the group consisting of $F^-$, $Cl^-$, $Br^-$, $I^-$, $ClO_4^-$, $CH_3COO^-$, and $CH_3(C_6H_4)SO_3^-$, with respect to viologen and maybe the same or different; or the formula

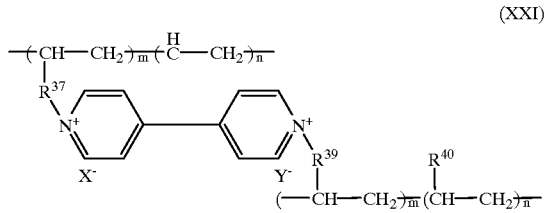

(XXI)

wherein m is an integer of more than 1, n is an integer of more than 0, $R^{37}$ and $R^{38}$ are each independently a $C_1-C_{20}$ divalent hydrocarbon residue, $R^{39}$ and $R^{40}$ are each independently a $C_1-C_{20}$ hydrocarbon group, a heteroatom-containing substituent, or a halogen atom, and $X^-$ and $Y^-$ represent counter anions selected from the group consisting of $F^-$, $Cl^-$, $Br^-$, $I^-$, $ClO_4^-$, $CH_3COO^-$, and $CH_3(C_6H_4)SO_3^-$, with respect to viologen and maybe the same or different.

2. An electrochromic mirror according to claim 1, wherein said solid ion conductive material is a polymer electrolyte obtained by solidifying a composition of an organic polar solvent, a supporting electrolyte and a urethaneacrylate of the formula

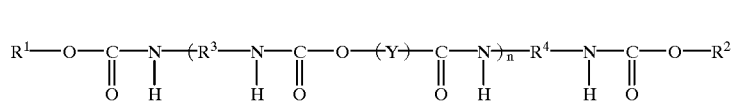

(II)

wherein $R^1$ and $R^2$ may be the same or different and each comprises an α,β-unsaturated ester moiety; $R^3$ and $R^4$ may be the same or different and each is a $C_1-C_{20}$ divalent hydrocarbon residue, Y is selected from the group consisting of polyether units, polyester units, polycarbonate units and mixtures thereof; and n is an integer of from 1 to 100.

3. An electrochromic mirror according to claim 1 wherein said solid ion conductive material is a polymeric electrolyte obtained by solidifying a compound comprising an organic polar solvent, a supporting electrolyte, and a poly-functional acryloyl-modified polyalkylene oxide and a mono-poly-functional acryloyl polyalkylene oxide represented by the formula

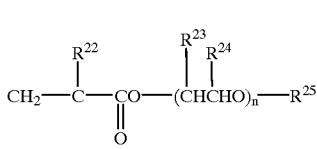

(XVII)

wherein $R^{22}$, $R^{23}$, $R^{24}$ and $R^{25}$ may be the same or different and each is a hydrogen atom or an alkyl group having from 1 to 5 carbon atoms, and wherein n is an integer greater than 1.

4. An electrochromic mirror according to claim 1 wherein said transparent electrically conductive substrate is a laminate comprising a transparent substrate and a transparent electrode layer formed thereon.

5. An electrochromic mirror according to claim 1 wherein said reflective electrically conductive substrate is a laminate including a transparent or opaque substrate having a reflective electrode layer formed thereon, a laminate including a transparent substrate having on one surface a transparent electrode layer and on the other surface a reflective layer, a laminate including a transparent substrate having a reflective layer formed and a transparent electrode layer formed one after another or a plate-like substrate which functions as a reflective layer and an electrode.

6. An electrochromic mirror according to claim 4 wherein said transparent substrate is selected from the group consisting of polyethylene terephthalate, polyamide, polysulfone, polyether sulfone, polyether etherketone, polyphenylene sulfide, polycarbonate, polyimide, polymethyl methacrylate and polystyrene.

7. An electrochromic mirror according to claim 5 wherein said transparent substrate is selected from the group consisting of polyethylene terephthalate, polyamide, polysulfone, polyether sulfone, polyether etherketone, polyphenylene sulfide, polycarbonate, polyimide, polymethyl methacrylate and polystyrene.

8. An electrochromic mirror according to claim 4 wherein said transparent electrode layer is an electrically conductive film formed a material selected from the group consisting of gold, silver, chrome, copper, tungsten, ITO ($In_2O_3$—$SnO_2$), tin oxide, silver oxide, zinc oxide and vanadium oxide.

9. An electrochromic mirror according to claim 5 wherein said transparent electrode layer is an electrically conductive film formed a material selected from the group consisting of gold, silver, chrome, copper, tungsten, ITO ($In_2O_3$—$SnO_2$), tin oxide, silver oxide, zinc oxide and vanadium oxide.

10. An electrochromic mirror according to claim 5 wherein said reflective electrode layer is a film of a material selected from the group consisting of gold, platinum, tungsten, tantalum, rhenium, osmium, iridium, silver, nickel and palladium and an alloy of platinum-palladium, platinum-rhodium and stainless steel.

11. An electrochromic mirror according to claim 1 wherein said ion conductive material is liquid, gel or solid.

* * * * *